United States Patent
Gaughan et al.

(10) Patent No.: US 9,333,959 B2
(45) Date of Patent: May 10, 2016

(54) BRAKE CYLINDER MAINTAINING VALVE

(71) Applicant: WABTEC HOLDING CORP., Wilmerding, PA (US)

(72) Inventors: Edward W. Gaughan, Greensburg, PA (US); William John Potter, Trafford, PA (US)

(73) Assignee: Wabtec Holding Corp., Wilmerding, PA (US)

( * ) Notice: Subject to any disclaimer, the term of this patent is extended or adjusted under 35 U.S.C. 154(b) by 127 days.

(21) Appl. No.: 13/854,538

(22) Filed: Apr. 1, 2013

(65) Prior Publication Data

US 2014/0125115 A1    May 8, 2014

Related U.S. Application Data

(60) Provisional application No. 61/619,575, filed on Apr. 3, 2012.

(51) Int. Cl.
| | |
|---|---|
| *B60T 15/18* | (2006.01) |
| *B60T 15/02* | (2006.01) |
| *B60T 13/26* | (2006.01) |
| *B60T 11/10* | (2006.01) |
| *B61H 13/20* | (2006.01) |

(52) U.S. Cl.
CPC ............. *B60T 15/021* (2013.01); *B60T 11/101* (2013.01); *B60T 13/266* (2013.01); *B60T 15/18* (2013.01); *B61H 13/20* (2013.01)

(58) Field of Classification Search
CPC ..... B60T 15/021; B60T 11/101; B60T 15/18; B60H 13/20
See application file for complete search history.

(56) References Cited

U.S. PATENT DOCUMENTS

| | | | |
|---|---|---|---|
| 2,992,861 A * | 7/1961 | Hursen ........................... | 303/33 |
| 3,279,867 A | 10/1966 | Bueler | |
| 3,731,983 A | 5/1973 | Washbourn | |
| 3,832,015 A | 8/1974 | Beck et al. | |
| 3,994,536 A | 11/1976 | Prada | |
| 4,025,126 A * | 5/1977 | Wilson ........................... | 303/33 |
| 4,063,784 A | 12/1977 | Pick | |
| 4,125,294 A | 11/1978 | Cannon | |
| 4,161,340 A | 7/1979 | Hart | |
| 4,230,377 A | 10/1980 | Goebels | |
| 4,339,155 A | 7/1982 | Hart | |
| 4,405,182 A | 9/1983 | Hart | |
| 4,453,779 A | 6/1984 | Bridigum | |
| 4,474,412 A | 10/1984 | Schmitt | |
| 4,478,460 A | 10/1984 | Wickham | |
| 4,678,241 A | 7/1987 | Tamamori et al. | |
| 5,044,698 A | 9/1991 | Hart et al. | |
| 5,213,397 A | 5/1993 | Troiani | |
| 5,326,159 A | 7/1994 | Hart et al. | |
| 5,387,030 A | 2/1995 | Gayfer et al. | |
| 5,429,426 A | 7/1995 | Hart | |
| 5,564,794 A * | 10/1996 | Hart ................................. | 303/3 |
| 6,126,245 A | 10/2000 | Barber et al. | |
| 6,769,744 B2 | 8/2004 | Marsh et al. | |
| 7,077,481 B2 | 7/2006 | Marsh et al. | |

* cited by examiner

*Primary Examiner* — Anna Momper
(74) *Attorney, Agent, or Firm* — The Webb Law Firm

(57) ABSTRACT

A system for maintaining brake cylinder pressure comprises a maintaining valve, a brake pipe, an emergency reservoir, and a brake cylinder configured to be in fluid communication with the brake pipe and the emergency reservoir. The brake pipe is configured to sustain a predetermined pressure within the brake cylinder during a brake application based on a differential between a pressure of the emergency reservoir and a pressure of the brake pipe.

13 Claims, 8 Drawing Sheets

BRAKE CYLINDER MAINTAINING VALVE

CROSS REFERENCE TO RELATED APPLICATIONS

This application claims the benefit of U.S. Provisional Application No. 61/619,575, filed Apr. 3, 2012, the entire content of which is hereby incorporated by reference.

BACKGROUND OF THE INVENTION

1. Field of the Invention

The present invention generally relates to brake apparatus for railway vehicles and, more particularly, to a valve for maintaining brake cylinder pressure for all service brake applications.

2. Description of Related Art

Railroad freight cars have a brake pipe that runs through each car and is coupled therebetween so as to extend continuously the length of the train. The brake pipe is charged with compressed air typically at the head end by a compressor on the locomotive. The compressed air not only provides the pneumatic brake force at the respective cars, but also serves as a communication link via which the car's brakes are controlled from the locomotive by increasing and decreasing the brake pipe pressure. Brake equipment for railroad freight cars utilizes control valves to control the operation of the brake cylinders and brakes for the freight cars, such as the ABDX control valve sold and manufactured by Wabtec Corporation.

When a train brake pipe is fully charged to the pressure setting of the locomotive brake valve device, a natural pressure gradient typically exists in the brake pipe due to leakage caused by wear and other issues resulting in pressure changes with the brake cylinders. Assuming the locomotive brake valve is set to charge the brake pipe to 90 psi, the pressure at each car from front to rear of the train will experience a slightly lower pressure due to leakage and fluid flow resistance as the pressure maintaining brake valve attempts to maintain the leakage. The brake pipe pressure will gradually rise from front to back in seeking the natural pressure gradient consistent with the application of brake pipe pressure at the locomotive. Current control valve technology generally only maintains cylinder leakage below 8 psi via a quick service limiting valve when the cylinder pressure falls below the 8-12 psi limiting valve setting.

SUMMARY OF THE INVENTION

In one embodiment, a system for maintaining brake cylinder pressure includes a maintaining valve, a brake pipe, an emergency reservoir, and a brake cylinder configured to be in fluid communication with the brake pipe and the emergency reservoir. The brake pipe is configured to sustain a predetermined pressure within the brake cylinder during a service brake application based on a differential between a pressure of the emergency reservoir and a pressure of the brake pipe.

The maintaining valve may include a first valve member having first and second positions and a second valve member having first and second positions. The brake cylinder may be in fluid communication with an exhaust passage when the first and second valve members are each in their respective first positions. The brake cylinder may be in fluid communication with the brake pipe when the first and second valve members are each in their respective second positions. The brake cylinder may be isolated from the brake pipe and the exhaust passage when the first valve member is in the first position and the second valve member is in the second position. The first valve member may be a check valve and the second valve member may be first and second diaphragm pistons. The first diaphragm piston may include a follower stem that defines an upper recess, a central passageway at an end of the follower stem, and a lower recess, with the second diaphragm piston configured to move the follower stem. The brake cylinder may be in fluid communication with the exhaust passage via the upper recess, the central passageway, a port connecting the central passageway to the lower recess, and the lower recess. The brake cylinder may be in fluid communication with the brake pipe via the upper recess.

The brake cylinder may be isolated from the brake pipe and the exhaust passage via engagement of the first valve member with a seat and engagement of the follower stem with the first valve member, where engagement of the follower stem with the first valve member substantially closes an open end of the central passageway. The system may further include an over-reduction valve configured to prevent back-flow of air from the brake cylinder into the brake pipe when brake pipe pressure is less than brake cylinder pressure. The system may also include a minimum application/release protection valve configured to prevent the flow of air from the brake pipe to the brake cylinder until a pressure within the brake cylinder has reached a predetermined value, and where the minimum application/release protection valve is configured to prevent the flow of air from the brake pipe to the brake cylinder from the maintaining valve during a release of a service brake application. The predetermined value may be about 10 psi. The system may further include a retainer nullification valve in fluid communication with the exhaust passage, where the retainer nullification valve includes a retainer port and is configured to prevent flow of air from the exhaust passage to the atmosphere.

In a further embodiment, a method for maintaining brake cylinder pressure includes providing a maintaining valve having a release position, an application position, and a lap position, and sustaining a predetermined pressure within the brake cylinder during a service brake application based on a differential between a pressure of the emergency reservoir and a pressure of the brake pipe. The maintaining valve is configured to be in fluid communication with a brake pipe, an emergency reservoir, and a brake cylinder.

The predetermined pressure may be sustained via the brake pipe. The predetermined pressure may be sustained within ±2 psi of a desired output. The brake cylinder may be in fluid communication with an exhaust passage when the maintaining valve is in the release position. The brake cylinder may be in fluid communication with the brake pipe when the maintaining valve is in the application position. The brake cylinder may be isolated from the brake pipe and the exhaust passage when the maintaining valve is in the lap position.

DESCRIPTION OF THE PREFERRED EMBODIMENTS

For purposes of the description hereinafter, spatial orientation terms, if used, shall relate to the referenced embodiment as it is oriented in the accompanying drawing figures or otherwise described in the following detailed description. However, it is to be understood that the embodiments described hereinafter may assume many alternative variations and embodiments. It is also to be understood that the specific devices illustrated in the accompanying drawing figures and described herein are simply exemplary and should not be considered as limiting.

Figure 1:
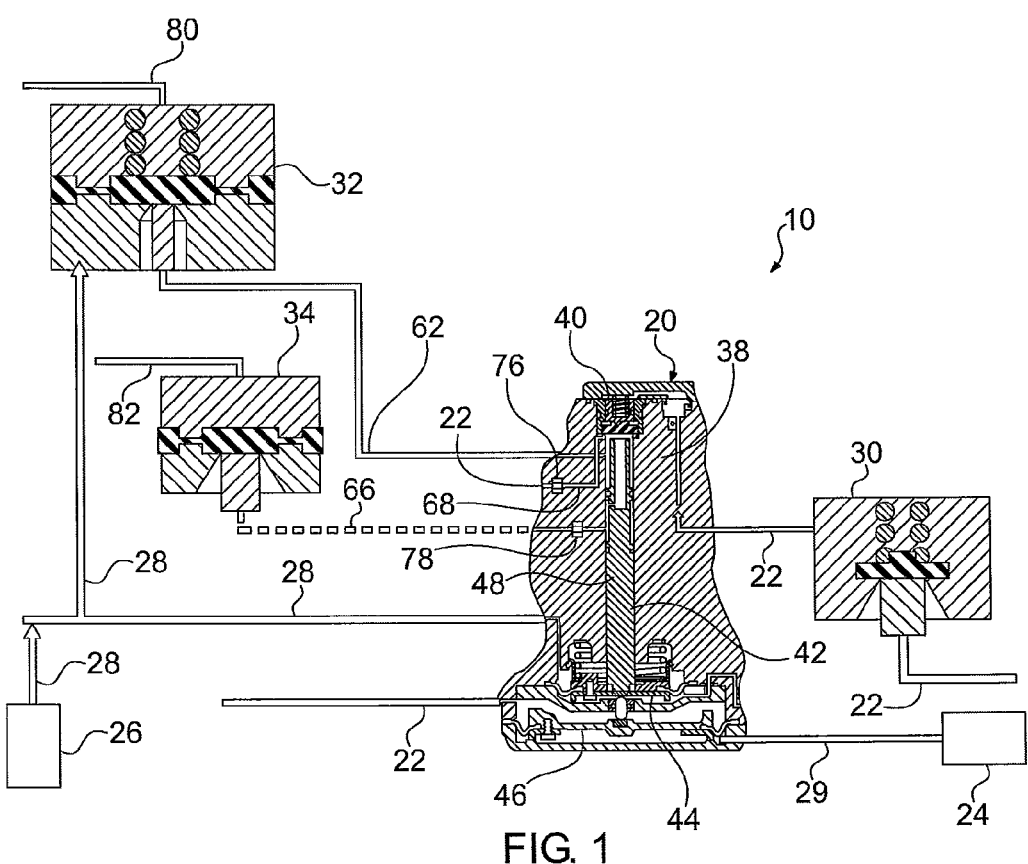
FIG. 1 is a schematic view of a system for maintaining brake cylinder pressure according to one embodiment of the present invention.
Figure 2:
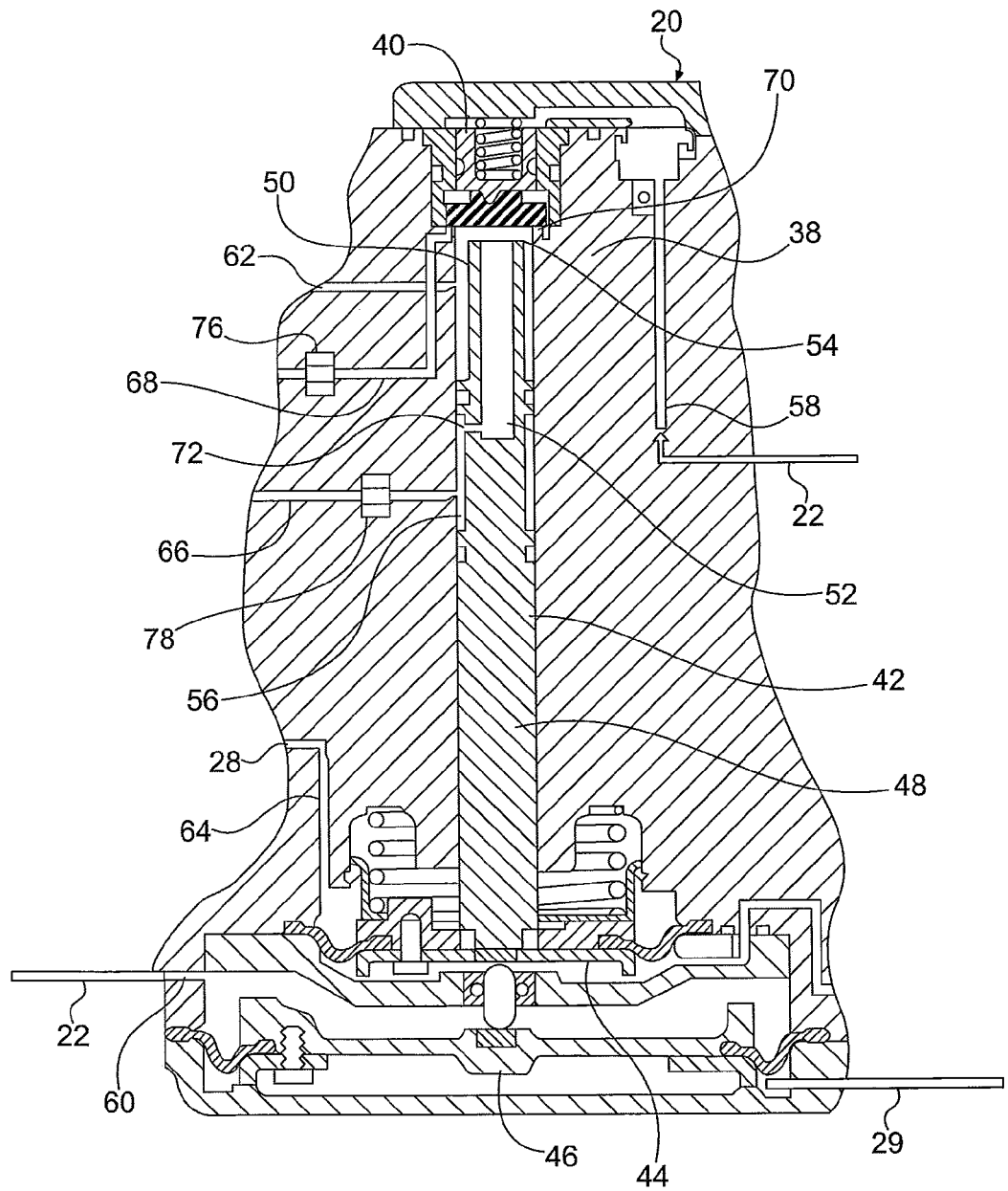
FIG. 2 is a partial schematic view of the system of FIG. 1 showing a brake cylinder maintaining valve according to one embodiment of the present invention.

Referring to FIGS. 1 and 2, one embodiment of a system for maintaining brake cylinder pressure includes a brake cylinder maintaining valve 20, a brake pipe 22, an emergency reservoir 24, and a brake cylinder 26 that is in fluid communication with the brake cylinder maintaining valve 20 via a brake cylinder passage 28. The system 10 also includes an over-reduction check valve 30, a minimum application/release protection valve 32, and a retainer nullification valve 34. The system 10 is configured so that the brake pipe 22 sustains a predetermined pressure within the brake cylinder 26 during a brake application based on a differential between a pressure of the emergency reservoir 24 and a pressure of the brake pipe 22. In other words, the emergency reservoir pressure is used as a reference pressure to determine the desired brake cylinder 26 pressure for a given brake pipe reduction. A predetermined ratio of cylinder pressure to brake pipe pressure reduction, such as 3:1, is determined by a balance-point set by the effective diaphragm, supply seat, exhaust seat areas, and individual spring loads of the brake cylinder. The system 10 utilizes brake cylinder feedback to offset the emergency reservoir/brake pipe differential and position the maintaining valve 20 in a lap position. Further, the brake pipe 22 is utilized to sustain leakage, not a separate reservoir. The system 10 provides a parallel control of the brake cylinder 26 during service brake applications, with the initial brake cylinder development controlled by the quick service limiting valve (not shown) and the main service piston/graduating valve (not shown), and with the maintaining valve 20 controlling brake cylinder 26 output levels during brake application. The system 10 may be configured to control brake cylinder pressure to within ±2 psi of the design output. An example of output control requirements based on a pressure differential between the emergency reservoir 24 and the brake pipe 22 is provided in Table 1 below.

TABLE 1

| ER | BP | Desired CYL |
|----|----|-------------|
| 90 | 90 | 0 |
| 90 | 80 | 25 |
| 90 | 70 | 50 |
| 90 | 65 | 65 |

Referring again to FIGS. 1 and 2, the brake cylinder maintaining valve 20 includes a body 38 that receives a first valve member 40 and a second valve member 42. The first valve member 40 is a check valve having a first position and a second position, although other suitable valve members may be utilized. The second valve member 42 comprises first and second diaphragm pistons 44, 46, with the first diaphragm piston 44 having a follower stem 48, although other suitable arrangements for the second valve member 42 may be utilized. The follower stem 48 defines an upper recess 50, a central passageway 52 at end 54 of the stem 48, and a lower recess 56. The body 38 defines first and second brake pipe passages 58, 60, first and second cylinder passages 62, 64, an exhaust passage 66, and a supply passage 68. The stem 48 has a first position and a second position. The first and second valve members 40, 42 are configured to selectively place the cylinder 26 in fluid communication with the exhaust passage 66 or the supply passage 68, and to selectively isolate the cylinder 26 from the exhaust passage 66 and supply passage 68.

Figure 3:
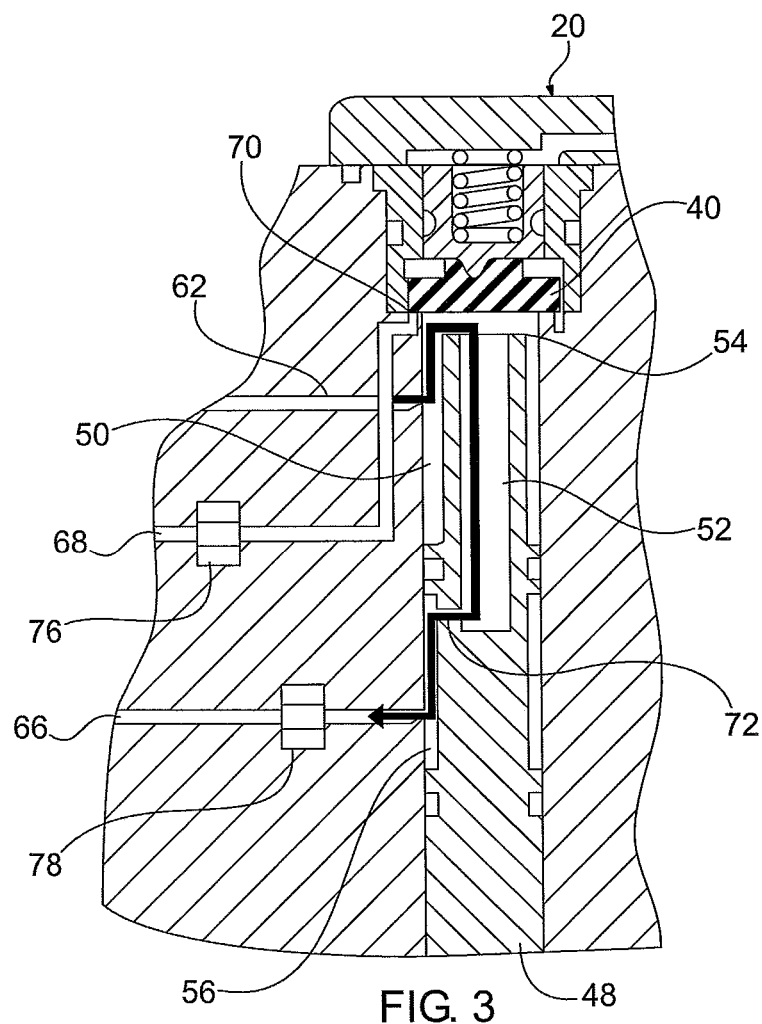
FIG. 3 is a partial schematic view of the system of FIG. 1 showing a release position of a brake cylinder maintaining valve according to one embodiment of the present invention.

Referring to FIG. 3, when the maintaining valve 20 is in the release position, the first valve member 40 is in the first position where the first valve member 40 is seated against a seat 70 to isolate the supply passage 68 from the first cylinder passage 62. The second valve member 42, namely the follower stem 48, is in the first position when an upper end of the stem 48 is spaced from the first valve member 40 with the central passageway 52 unobstructed. Thus, in the release position of the maintaining valve 20, the first cylinder passage 62 is in fluid communication with the exhaust passage 66 via the upper recess 50, the central passageway 52, a port 72 connecting the central passageway 52 to the lower recess 56, and the lower recess 56. The follower stem 48 is movable within the body 38 of the maintaining valve 20 via the second diaphragm piston 46. In particular, the second diaphragm piston 46 is movable based on a pressure differential between the second brake pipe passage 60 and the emergency reservoir 24, which causes a portion of the second diaphragm piston 46 to engage and move the first diaphragm piston 44.

Figure 4:
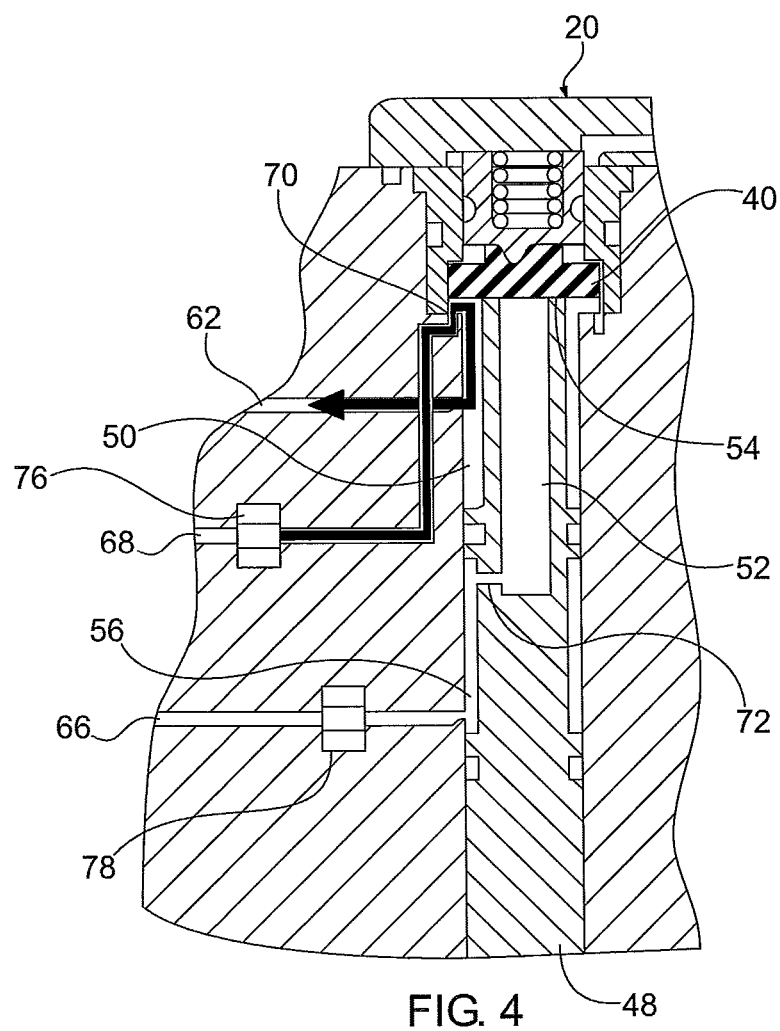
FIG. 4 is a partial schematic view of the system of FIG. 1 showing an application position of a brake cylinder maintaining valve according to one embodiment of the present invention.

Referring to FIGS. 1 and 4, when the maintaining valve 20 is in the application position, the first valve member 40 is in the second position, where the first valve member 40 is spaced from the seat 70 to connect the supply passage 68 to the first cylinder passage 62 and to the brake cylinder 26. The second valve member 42, namely the follower stem 48, is in the second position where the upper end of the stem 48 engages the first valve member 40 to close the central passageway 52. Thus, in the application position of the maintaining valve 20, the first cylinder passage 62 is in fluid communication with the supply passage 68 via the space between the first valve member 40 and the seat 70, and the upper recess 50.

Figure 5:
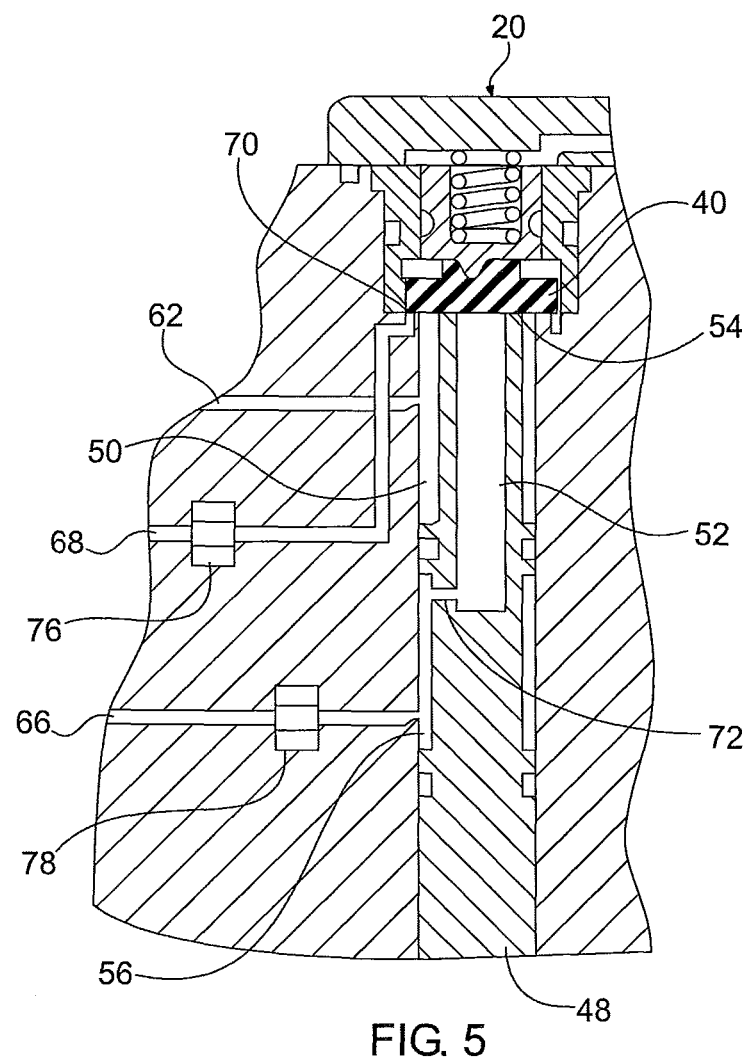
FIG. 5 is a partial schematic view of the system of FIG. 1 showing a lap position of a brake cylinder maintaining valve according to one embodiment of the present invention.
Figure 6:
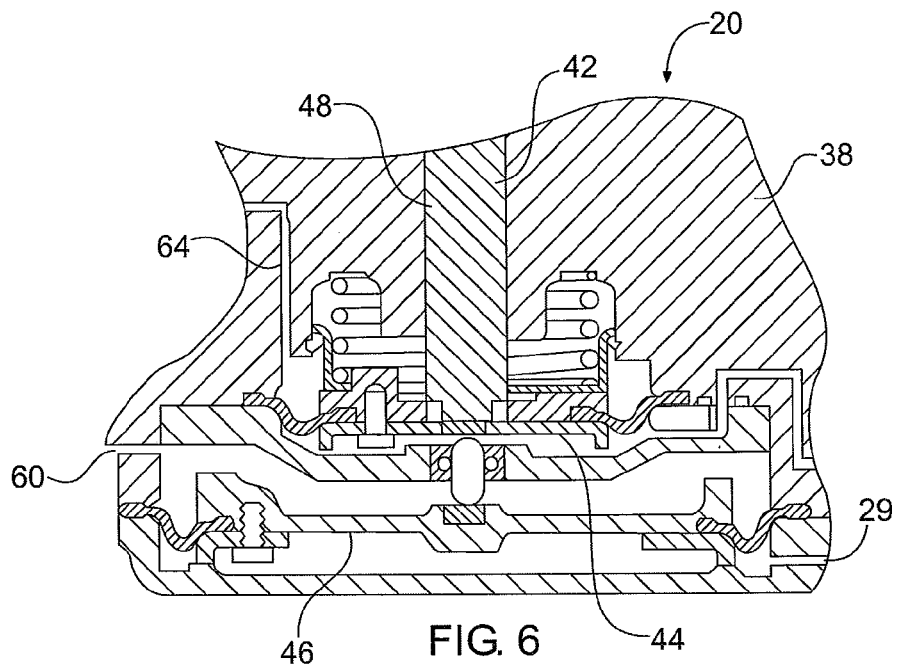
FIG. 6 is a partial schematic view of the system of FIG. 1 showing a lap position of a lower portion of a brake cylinder maintaining valve according to one embodiment of the present invention.

Referring to FIGS. 1, 5, and 6, when the maintaining valve 20 is in the lap position, the first valve member 40 is in the first position, where the first valve member 40 is seated against the seat 70 to isolate the supply passage 68 from the first cylinder passage 62. The second valve member 42, namely the follower stem 48, is in the second position, where the upper end of the stem 48 engages the first valve member 40 to close the central passageway 52. Thus, in the lap position of the maintaining valve 20, the supply passage 68 is isolated from the first cylinder passage 62 and the first cylinder passage 62 is isolated from the exhaust passage 66. As shown in FIG. 6, the brake cylinder pressure from the second cylinder passage 64 is developed on the first diaphragm piston 44 to counteract the emergency reservoir/brake pipe differential, thereby moving the maintaining valve 20 to the lap position.

Referring to FIGS. 1-6, the maintaining valve 20 includes a first choke 76 in fluid communication with the supply passage 68, and a second choke 78 in fluid communication with the exhaust passage 66. The first and second chokes 76, 78 control the increase and decrease of the brake cylinder pressure. The first choke 76 controls the capacity of air supplied from the supply passage 68 to the first cylinder passage 62 and brake cylinder 26. The capacity to the first cylinder passage 62 and brake cylinder 26 must be controlled to avoid developing an excessive brake pipe pressure decrease during a brake application due to the additional demand on maintaining the brake pipe pressure. Without limiting the capacity of brake pipe 22 to the brake cylinder 26, a greater brake pipe reduction may result at the rear of a train than desired, when maintaining brake cylinder leakage and would decrease brake pipe pressure and increase the cylinder pressure on cars without leakage. The second choke 78 controls the venting of excessive pressure in the event there is leakage into the brake cylinder 26.

Figure 7:
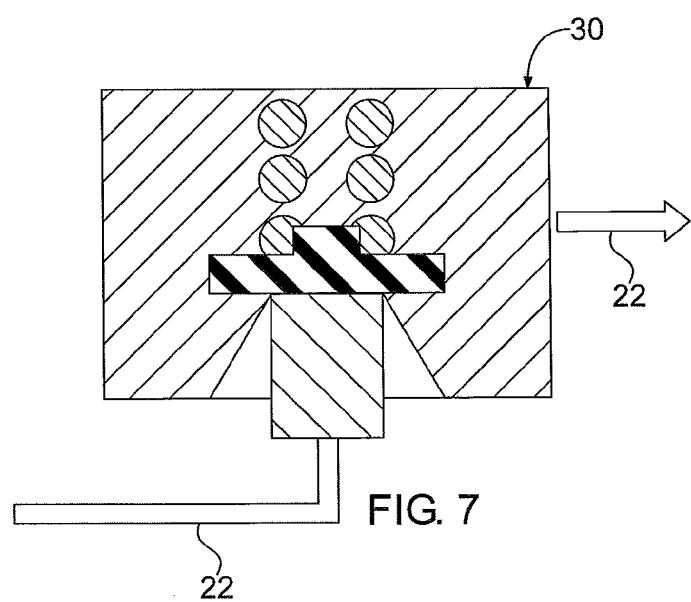
FIG. 7 is a partial schematic view of the system of FIG. 1 showing an over-reduction check valve according to one embodiment of the present invention.

Referring to FIG. 7, the over-reduction check valve 30 is in fluid communication with the brake pipe 22 and the first brake pipe passage 58. The over-reduction check valve 30 prevents back-flow of brake cylinder air into the brake pipe 22 when brake pipe pressure is less than the brake cylinder pressure. The over-reduction check valve 30 is a check valve with a generally light spring load, although other suitable valves may be utilized. The over-reduction check valve 30 allows the flow of compressed air from the brake pipe 22 to the maintaining valve 20 until the pressure of the brake cylinder 26 becomes greater than the brake pipe 22, i.e., an over-reduction. The over-reduction check valve 30 may be used to prevent back-flow, for example, during a 30 psi brake pipe reduction from a 90 psi and a full service equalization pressure of the brake cylinder 26 is 65 psi.

Figure 8:
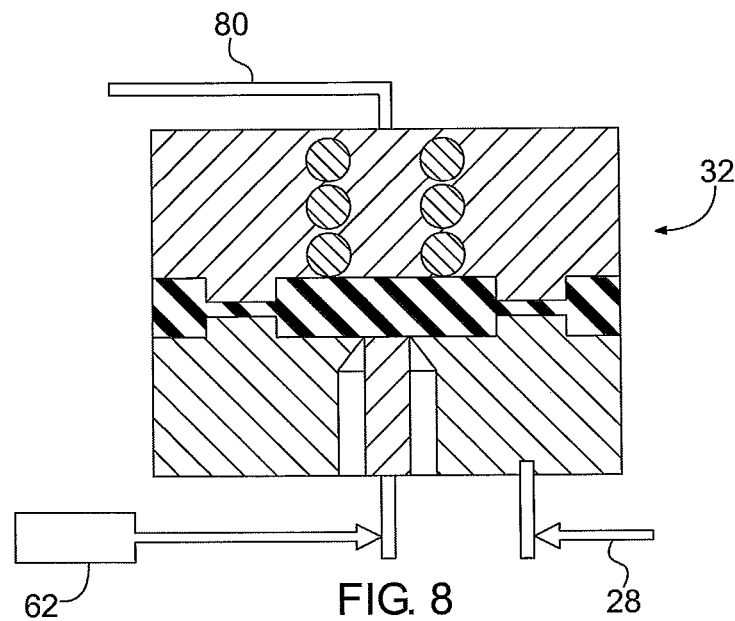
FIG. 8 is a partial schematic view of the system of FIG. 1 showing a minimum application/release protection valve according to one embodiment of the present invention.

Referring to FIG. 8, the minimum application/release protection valve 32 is in fluid communication with the first cylinder passage 62 of the maintaining valve 20 and the brake cylinder 26 via the brake cylinder passage 28. The minimum application/release protection valve 32 prevents the flow of the brake pipe 22 to the brake cylinder 26 until the brake cylinder 26 has a pressure greater than 10 psi. In particular, the spring load prevents the connection from the maintaining valve 20 to the brake cylinder 26 until the brake cylinder pressure is greater than 10 psi, which is typically when the quick service limiting valve is closed. The minimum application/release protection valve 32 also prevents the flow of the brake pipe 22 to the brake cylinder 26 from the maintaining valve 20 during release of the service application. More specifically, the minimum application/release protection valve 32 has a retainer port 80 to receive backed-up retainer exhaust. The backed-up retainer exhaust and spring load prevents the connection from the maintaining valve 20 during service application release until full charge of the brake pipe 22. The minimum application/release protection valve 32 is a diaphragm check valve with a spring load to prevent the flow of air until the service slide valve develops a pressure greater than 10 psi. Without the minimum application/release protection valve 32, light brake pipe reduction may cause undesired release of the brake cylinder 26 due to the flow of the brake pipe 22 from the maintaining valve 20 to the accelerated application valve (not shown) and quick service limiting valve of the main control valve (not shown). Further, without the minimum application/release protection valve 32, during release the maintaining valve 20 may try to fill the brake cylinder 26 and slow the brake pipe increase.

Figure 9:
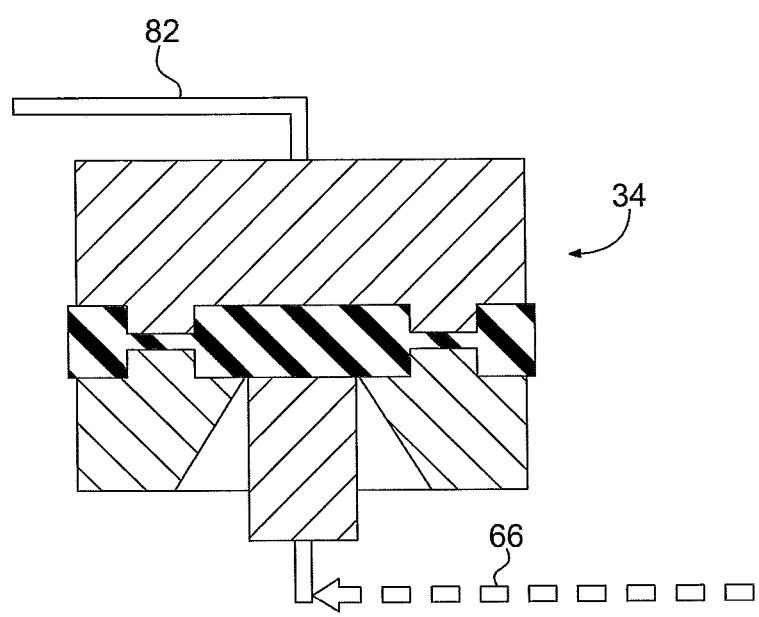
FIG. 9 is a partial schematic view of the system of FIG. 1 showing a retainer nullification valve according to one embodiment of the present invention.

Referring to FIG. 9, the retainer nullification valve 34 is in fluid communication with the exhaust passage 66 of the maintaining valve 20. The retainer nullification valve 34 prevents the connection from the maintaining valve 20 to exhaust atmosphere if a retainer valve is set to a high pressure position, such as a 20 psi retained pressure. Without the retainer nullification valve 34, the maintaining valve 20 would vent excess cylinder pressure. The retainer nullification valve 34 is embodied as a diaphragm check valve, although other suitable valves may be utilized, and includes a retainer port 82, such that the load from the retainer port 82 will prevent exhaust flow from the maintaining valve 20.

Figure 10:
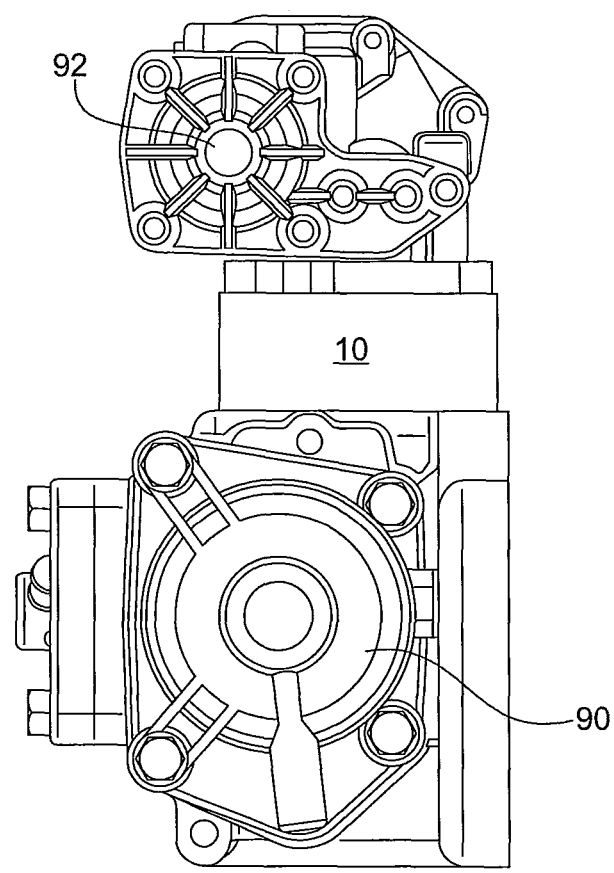
FIG. 10 is a schematic view of the system of FIG. 1 showing a position of the system relative to a brake control valve service portion and manual release valve according to one embodiment of the present invention.

Referring to FIG. 10, in one embodiment, the system for maintaining brake cylinder pressure is embodied as a module secured to a service portion of a brake control valve 90, although the system 10 could also be incorporated into and/or formed integrally with one or more portions of a brake control valve. The system 10 is positioned between the service portion 90 and a manual release valve 92.

While several embodiments were described in the foregoing detailed description, those skilled in the art may make modifications and alterations to these embodiments without departing from the scope and spirit of the invention. Accordingly, the foregoing description is intended to be illustrative rather than restrictive.

The invention claimed is:

1. A system for maintaining brake cylinder pressure comprising:
   a maintaining valve;
   a brake pipe;
   an emergency reservoir;
   a brake cylinder configured to be in fluid communication with the brake pipe and the emergency reservoir; and
   a minimum application/release protection valve configured to prevent the flow of air from the brake pipe to the brake cylinder until a pressure within the brake cylinder has reached a first predetermined value,
   wherein the brake pipe is configured to sustain a second predetermined pressure within the brake cylinder during a brake application based on a differential between a pressure of the emergency reservoir and a pressure of the brake pipe, and wherein the minimum application/release protection valve is configured to prevent the flow of air from the brake pipe to the brake cylinder from the maintaining valve during a release of a service brake application.

2. The system of claim 1, wherein the maintaining valve comprises a first valve member having first and second positions and a second valve member having first and second positions.

3. The system of claim 2, wherein the brake cylinder is in fluid communication with an exhaust passage when the first and second valve members are each in their respective first positions.

4. The system of claim 3, wherein the brake cylinder is in fluid communication with the brake pipe when the first and second valve members are each in their respective second positions.

5. The system of claim 4, wherein the brake cylinder is isolated from the brake pipe and the exhaust passage when the first valve member is in the first position and the second valve member is in the second position.

6. The system of claim 5, wherein the first valve member comprises a check valve and the second valve member comprises first and second diaphragm pistons.

7. The system of claim 6, wherein the first diaphragm piston comprises a follower stem that defines an upper recess, a central passageway at an end of the follower stem, and a lower recess, the second diaphragm piston configured to move the follower stem.

8. The system of claim 7, wherein the brake cylinder is in fluid communication with the exhaust passage via the upper recess, the central passageway, a port connecting the central passageway to the lower recess, and the lower recess.

9. The system of claim 7, wherein the brake cylinder is in fluid communication with the brake pipe via the upper recess.

10. The system of claim 7, wherein the brake cylinder is isolated from the brake pipe and the exhaust passage via engagement of the first valve member with a seat and engagement of the follower stem with the first valve member, and wherein engagement of the follower stem with the first valve member substantially closes an open end of the central passageway.

11. The system of claim 3, further comprising a retainer nullification valve in fluid communication with the exhaust passage, the retainer nullification valve comprising a retainer port and configured to prevent flow of air from the exhaust passage to the atmosphere.

12. The system of claim 1, further comprising an over-reduction valve configured to prevent back-flow of air from the brake cylinder into the brake pipe when brake pipe pressure is less than brake cylinder pressure.

13. The system of claim 1, wherein the first predetermined value is about 10 psi.

* * * * *